US008625658B2

(12) United States Patent
Kummetz (10) Patent No.: US 8,625,658 B2
(45) Date of Patent: Jan. 7, 2014

(54) DIGITAL REPEATER HAVING BANDPASS FILTERING, ADAPTIVE PRE-EQUALIZATION AND SUPPRESSION OF NATURAL OSCILLATION

(75) Inventor: Thomas Kummetz, Forest, VA (US)

(73) Assignee: Andrew Wireless Systems GmbH, Buchdorf (DE)

( * ) Notice: Subject to any disclaimer, the term of this patent is extended or adjusted under 35 U.S.C. 154(b) by 60 days.

(21) Appl. No.: 12/882,941

(22) Filed: Sep. 15, 2010

(65) Prior Publication Data

US 2011/0002367 A1    Jan. 6, 2011

Related U.S. Application Data

(63) Continuation of application No. 10/495,144, filed as application No. PCT/EP02/12573 on Nov. 11, 2002, now Pat. No. 7,809,047.

(30) Foreign Application Priority Data

Nov. 12, 2001   (DE) .................................. 101 55 179

(51) Int. Cl.
*H04B 3/36* (2006.01)
*H04B 1/38* (2006.01)

(52) U.S. Cl.
USPC ........... 375/211; 375/219; 375/229; 370/274; 370/315; 370/316

(58) Field of Classification Search
USPC ...................... 375/211, 214, 219, 221, 222, 375/240.26–240.29, 285, 295, 296, 316, 375/344, 213, 229–236, 346–347, 350; 370/315, 316, 324, 329, 341, 226, 243, 370/246, 274, 279, 293, 492, 501
See application file for complete search history.

(56) References Cited

U.S. PATENT DOCUMENTS 4,845,746 A    7/1989  Li
5,134,464 A    7/1992  Basile et al.
(Continued)

OTHER PUBLICATIONS

Paul Bourke, Cross Correlation, Aug. 1996, http://paulbourke.net/miscellaneous/correlate, pp. 1-13.*

(Continued)

*Primary Examiner* — Sam K Ahn
*Assistant Examiner* — Linda Wong
(74) *Attorney, Agent, or Firm* — Wood, Herron & Evans, LLP (57) ABSTRACT

Repeaters, event those having digital processing, exist. The significant drawback of these digital repeaters is that the computational complexity or the processing speed has to be very high in order to guarantee, particularly when compensating for echo, that the necessary delay does not excessively impair the performance. The aim of the invention is to provide a structure of the repeater in which the computational complexity is reduced without this reduction having a negative effect on the performance during signal filtering and/or suppression of natural oscillation. To this end, the invention provides that in order to carry out bandpass filtering, adaptive pre-equalization and suppression of the natural oscillation, the components of the repeater in the uplink branch and downlink branch are arranged in a designated sequence, whereby duplex filters are used for coupling both repeater branches to the antennas. In addition, only one reconfiguration in the modules at the user is necessary in order to adapt to user-specific requirements. The invention is used in the field of digital repeaters for data systems technology and telecommunications technology.

8 Claims, 4 Drawing Sheets

(56) References Cited

U.S. PATENT DOCUMENTS

| | | |
|---|---|---|
| 5,163,044 A | 11/1992 | Golden |
| 5,790,632 A | 8/1998 | Antonio et al. |
| 6,385,176 B1 | 5/2002 | Iyengar |
| 6,606,483 B1 * | 8/2003 | Baker et al. .................. 455/126 |
| 6,625,286 B1 * | 9/2003 | Rubacha et al. ................ 381/93 |
| 6,697,603 B1 * | 2/2004 | Lovinggood et al. ........ 455/13.1 |
| 6,745,003 B1 * | 6/2004 | Maca et al. .................. 455/11.1 |
| 6,831,900 B2 | 12/2004 | Blake |
| 6,879,625 B1 * | 4/2005 | Levonas et al. ............... 375/211 |
| 6,934,511 B1 * | 8/2005 | Lovinggood et al. ........ 455/11.1 |
| 6,940,893 B1 | 9/2005 | Pinkney |
| 7,043,203 B2 | 5/2006 | Miquel et al. |
| 7,133,442 B2 | 11/2006 | Hamdi |
| 7,423,983 B1 | 9/2008 | Li et al. |
| 7,809,047 B2 | 10/2010 | Kummetz |
| 7,978,113 B2 * | 7/2011 | Kulchycki .................... 341/155 |
| 2001/0038670 A1 * | 11/2001 | Whight ......................... 375/267 |
| 2002/0044594 A1 * | 4/2002 | Bongfeldt ..................... 375/213 |

OTHER PUBLICATIONS

Ten-Page Lyons, R.G., "Digital Filter Terminology", Addison Wesley Longman, Inc., Appendix F, pp. 1-9; 1997.

* cited by examiner

DIGITAL REPEATER HAVING BANDPASS FILTERING, ADAPTIVE PRE-EQUALIZATION AND SUPPRESSION OF NATURAL OSCILLATION

RELATED APPLICATIONS

This application is a Continuation Application of U.S. Patent Application Publication No. US2005/0215193, Ser. No. 10/495,144, entitled "DIGITAL REPEATER HAVING BANDPASS FILTERING, ADAPTIVE PRE-EQUALIZATION AND SUPPRESSION OF NATURAL OSCILLATION", filed Jan. 11, 2005, which is a U.S. National Phase filing of PCT Application Publication No. WO 2003/043216, entitled "DIGITAL REPEATER HAVING BANDPASS FILTERING, ADAPTIVE PRE-EQUALIZATION AND SUPPRESSION OF NATURAL OSCILLATION", filed Nov. 11, 2002, which claims priority to German Patent Application No. DE 101 55 179, entitled "DIGITAL REPEATER HAVING BANDPASS FILTERING, ADAPTIVE PRE-EQUALIZATION AND SUPPRESSION OF NATURAL OSCILLATION", filed Nov. 12, 2001, which applications and publications are incorporated herein by reference in their entireties.

BACKGROUND OF THE INVENTION

The invention covers a repeater with a digital signal processing module with bandpass filtering as well as the suppression of the oscillation of the repeater as its major function.

Repeaters are frequently used to improve coverage in areas where the typical coverage of cellular networks or broadcast networks is insufficient. The general problem of repeater installation is that it requires the isolation between receiving and transmitting antennas to be higher than the gain of the on-frequency repeater to prevent it from oscillation.

In order to avoid oscillation for the repeater with the interference caused in the mobile communication or broadcast network, the repeater gain must be reduced by a gain margin with respect to the decoupling of the antennas. This safety gain margin is understood to be the difference between the gain of the repeater amplifier and the isolation of the antennas. Both measurements are determined with reference to the input and output terminals of the repeater and most frequently expressed in dB. The safety gain margin is frequently set to a 15 dB number that is determined at the time of the installation using an averaged measurement of the antenna decoupling. As this number is subject to environmental and weather conditions, the safety gain margin might need to change and follow those changes. Even with an active tracking mechanism of the antenna isolation, the operation of the repeater is limited in its enhancement and thus the repeater range and quality are the trade-off that causes the repeater installation to be less economical.

From DE 199 23 790 A1 the circuitry and the process to adaptively control the gain of an amplifier with feedback is known. Another variant of this is detailed in DE 197 52 283 A1. In the procedures described in DE 197 52 283 A1, the operation of the amplifier gain Vo is controlled in such a way that the gain margin relative to Vs, the gain of onset of oscillation, is maintained high enough to ensure a stable operation of the amplifier with feedback. The procedure does analyze the total gain which increases for a repeater operated close to the point of instability. To ensure the gain margin to be high enough for a continuous and safe operation of the amplifier, the circuitry and procedure described in DE 197 52 283 A1, the amplifier is continuously monitored and controlled.

In order to prevent the amplifier from oscillation, the difference between the regulated amplification Vo of the amplifier and the amplification for the onset of oscillation Vs shall not be reduced. In order to support same, the circuitry exhibits a memory for a pre-determined oscillation margin, which is defined by the ratio Vs/Vo.

Furthermore, the monitoring and data interpreting unit is designed in such a manner that it can determine the current safety gain margin of the amplifier from the change of the signal level at the amplifier output as a function of the change of the pre-determined amplification and compare this with the stored safety gain margin.

if the pre-determined safety gain margin is violated the pre-determined amplification Vo is lowered, if however the current gain does not violate the safety gain margin stored and is even larger, the amplification Vo of the amplifier is raised.

A mechanism for periodic changes of the amplifier gain can be implemented with an attenuator element for the periodic lowering of the pre-determined amplification. The pre-determined amplification of the amplifier will be lowered temporarily below the pre-determined safety gain margin during the monitoring and evaluation phase which will also reduce the probability of oscillation of the amplifier.

According to DE 197 52 283 A1, the procedure of the adaptive control of the amplification of a amplifier with feedback covers the following steps:

pre-setting the gain Vo of the amplifier;

periodical change of the preset gain Vo by a pre-determined amount;

supervising and evaluating a change of the level at the amplifier output during periodic changing of the preset gain; and raising or lowering preset gain Vo by a second pre-determined to be operating with a gain as close as possible to the safety gain margin without violating it.

In cellular radio networks repeater are commonly used for the extension of the coverage, e.g. in tunnels, large buildings or to supply coverage to uncovered areas, and wherever the installation of a base station is too complex.

The principle of the conventional repeater is the bi-directional amplification of radio signals in the Uplink and the Downlink direction. The radio signals remain on the same frequency as received. The Downlink signal, the signal coming from the base station of the radio network, is received with a highly directional donor antenna, amplified in the repeater, possibly filtered and re-transmitted to the mobile station via a coverage antenna. At the same time, the Uplink signal is received coming from the mobile station with the coverage antenna, is amplified in the repeater, possibly filtered and sent back to the base station via the donor antenna. The signal can be filtered either channel-selective or band-selective. Both repeater paths are usually coupled to the antenna using duplex filters. In its function to amplify, filter and re-transmit the radio signal the repeater typically introduces error (phase and amplitude errors, as well as additional noise and spurious signals), which can unfavorably affect the connection. In addition, a repeater of known design has limited dynamics: at the lower end limited by the noise of the input stages, at the higher end limited by the maximum power output power capabilities of the final power amplified stage.

In order to improve the transmission quality of the signals in repeaters, DE 196 49 853 defines a repeater for radio signals, which demodulates the received radio signals of a digital cellular radio network, transmits the data by the means of a data link (LAN, WAN) and re-modulates the data again to re-transmit the radio signal at the remote location. This repeater consists of the following functional units:

Receiver, channel filter, amplifier and demodulator for the Uplink path; Modulator and power amplifier for the Downlink path; as well as at least a data interface.

The data interface contains substantially the following functional units: Multiplexer, Demultiplexer, digital data processing control and peripheral interface adapter.

The advantage of this type of repeater is the spatial isolation of donor and coverage antenna or the economical data line instead of a high-quality high frequency line used to connect the two antenna locations. Further advantage is that problems of the signal distortion through noise, intermodulation and amplitude or phase distortions by the digital technique can be avoided. The distance between the two partial devices of the repeater can be increased to a relatively large distance without losing signal quality of the digital transmission of the demodulated signal. Limiting factor here is only the maximally permissible signal delay.

The repeater described in DE 196 49 854 is in a similar fashion demodulating the received radio signals, processing the data and re-modulates the digital data streams for transmission. Measurements of the field strength are used as a control signal to adjust the output power of the transmission amplifier. Each repeater path covers the following functional units:

Duplex filter, preamplifier, local oscillator, mixer, channel filter, demodulator, modulator and power amplifier.

In TDMA mobile networks (Time Division Multiple Access) the measurement of the received signal strength is carried out on a time slot basis. The demodulated digital data stream is amplified and injected into a modulator and re-transmitted with least possible errors. However, during this signal processing, no channel decoding is performed and the implementation is limited in its digital signal processing to minimize signal distortion and interference in order to substantially improve the quality of the radio network coverage. The functional units for each repeater path are a pre-amplifier, mixer, local oscillator, channel filter, demodulator, modulator and power amplifier, with the possibility of multiple paths aligned in parallel according to the number of required channels. The repeater can be remotely controlled and monitored over a radio data link established between the base station and the repeater favorably using the same signal the repeater is amplifying. This functionality is implemented by either a data modem coupled to the donor antenna or a device that is fed by the demodulated signals of the digital path inside the repeater.

From DE 196 49 855 A1 a mobile repeater is well-known. The radio signal coming from the mobile station is injected into a preamplifier after having passed through a duplex filter and mixed down into its base band or into an intermediate frequency band. The mixing frequency will be defined by a local oscillator. The base band or intermediate frequency signal is channel filtered and then demodulated providing a digital data stream. The signal is re-modulated onto a carrier frequency, raised in power by power amplifier and filtered with a duplex filter, and radiated via the coverage antenna to the mobile station. The mobile repeater further contains an intelligent control unit, which detects and analyzes signaling traffic between base stations and mobile stations, as well as the respective signal level. Thus it is possible to assign the coverage of the mobile stations to a dedicated base station of the most favorable of all possible base stations in the area and still support handover.

Beside the described channel selective repeaters, band selective repeaters are also well known. This unit filters re-transmits a whole frequency band with several channels. High selectivity values of the band filter are necessary to avoid disturbances close to the band limits. The problem of the linear repeater is now that feedback between the two antennas can lead to fatal interference or even oscillation. Therefore the antennas must be sufficiently decoupled for this type of repeater. In order to decrease the amount of feedback for the linear repeater, the two antennas have to be mounted far apart from each other which typically leads to high installation costs. In addition, the installation and maintenance costs are quite high as isolation has to be determined carefully during and periodically after the installation of the repeater with the possibility to re-adjust the repeater frequently.

Another way to implement a repeater based system for radio coverage is depicted in DE 196 48 178 A1, for which the injected radio signal is shifted to another frequency in the same radio band. In order to avoid that the terminals would not be able to successfully decode the information on the converted frequencies and to avoid the consequent erroneous reaction the modulation is changed to inverted side bands. For this the repeater contains:

two parallel input amplifiers for the input signals,
a mixer at each output of each input amplifier,
a bandpass filter at each output of each mixer,
an output amplifier at each output of each filter, the outputs of the output amplifiers being joined to generate an output signal,
at least one oscillator connected to the mixer, wherein
each mixer shifts one frequency of the input signal to another frequency within the bandpass of the system, and
the frequency position of the modulation is reflected on the frequency axis of the other frequency.

In EP 1087559 A1, a repeater for a wireless radio network is described in more detail that uses signal processing to reduce the unwanted coupling between the output of the repeater and the input. With the means of digital signal processing, an echo signal is produced that is similar to the feedback signal between the two antennas, which is then subtracted from the signal in the main path and thus eliminating the echo signal caused by the insufficient decoupling of the antennas, so that up to a remaining error, the echo is eliminated. The digital signal processing contains in detail:

an adaptive complex filter,
a mechanism for adjustment of the filter coefficients, which exhibits a quadrature modulator for the conversion of the received signal or output signal to an equivalent base-band signal,
a FFT processor (Fast Fourier Transform), which produces an estimated signal from the equivalent base band signal,
and a DSP (digital signal processor). The DSP produces a complex impulse response from the estimated signal of the FFT processor, whereby the filter coefficients of the adaptive complex filter are adjusted in accordance with the complex impulse response. To limit the computing complexity and the convergence rate the impulse response exhibits a finite bit length/length, which corresponds to the number of filter coefficients.

In further variation of the repeater known from EP 1 087 559 A1, a digital filter with band-pass characteristic and a mechanism for adjustment of the filter coefficients is included. The mechanism for the adjustment of the filter coefficients, which consists of a FFT processor and the DSP processor are implemented as described above. In systems incorporating BST-OFDM modulation schemes (Band Segmented Transmission Orthogonal Frequency Division Multiplexing) and/or DVB-T System (Digital Video Broadcast- Terrestrial), in which the amplitudes of the carriers of the CP signal (Continual Pilot) and/or the TMCC signal (Transmission and Multiplexing Configuration Control) is constant, the accuracy of the estimate of the transfer function increases, if a rough estimation of the transfer function is made on the basis of the CP signal and/or the TMCC signal, which is contained in all symbols of the BST-OFDM signal, and a fine estimate by means of the SP signal (Scattered pilot), which is transmitted in a certain symbol interval. The introduced delay is problematic in the repeater implementation, so that the introduced delay is significantly smaller than the repeat interval of the OFDM signals.

The previous summary of the state of the art for repeater points out, that digital signal processing is well known within repeaters. The disadvantage of such a digital repeater is in the fact that the complexity of processing and/or speed of operation are demanding requirements to ensure the impact on the signal delay to still be in the acceptable range, in particular within implementation incorporating echo compensation. Although the digital conversion promises significant improvement of the technical parameters in comparison to conventional analog conversion, the digital signal processing for bi-directional amplifiers (repeater) applications with their broad field of applications in portable radio communication and data networks as well as in the common broadcast radio technology is not yet commonly established. This is even more surprising, as both the communications technology industry and telecommunications are extremely progressive and innovative industries, where improvements and simplifications are accepted and established quickly.

The invention addresses the task to minimize the complexity and costs of a repeater with digital signal processing without trading in performance in the areas of signal filtering and echo cancellation.

SUMMARY OF THE INVENTION

The solution to the above task is based upon a repeater platform with a digital signal processing incorporating bandpass filtering, adaptive distortion correction and suppression of the oscillation due to feedback. The repeater platform consists of the following components in the Uplink and Downlink path in the following order:

analog mixer for the down-conversion of the input signal,
analog-to-digital converters,
echo compensator using an internally generated reference signal,
bandpass filter,
adaptive equalizer,
digital-to-analog converter,
analog mixer for up-conversion,
adaptive feedback repeater amplifier.

The procedure in the invention has the advantage to cover different mobile communication systems like GSM, UMTS, Tetra, IS 136 or IS 95 and user requirements in a surprisingly simple way. The complexity of circuitry is relatively small despite its possibilities and flexibility. Furthermore it is of advantage that on the signal processing platform the combination of the used digital processes result in a multifold reduction of interference.

In an embodiment of the invention, the echo compensator exhibits digital signal processing element with an FIR filter for suppression of the feedback between transmission and reception antenna. The FIR filter coefficients are derived from a computed correlation of sampled data of the input and output of the repeater path. The FIR filter basically represents the inverse of the external feedback path and the external echo is cancelled by applying it to a reference signal that is coupled off the output of the repeater and summing it into the main path of the repeater at the correct signal delay.

The use of adaptive FIR filter and DSP processor makes possible that for the computation of the correlation between input and output signal, the setup of the delay in the feedback path and the FIR filter—the complexity of processing can be reduced. The total time delay of the repeater path with the digital signal processing is relatively small in both the GSM-systems as well as in the UMTS-system and its value is easily found to be below 7 µs, even including the bandpass filter.

In further extension of the invention, the amplifier is adjustable and the reference signal is taken from the input of the amplifier, with the amplifier being completely bypassed or switched off.

The invention exhibits the advantage that the repeater can be operated at an even negative gain margin ensuring a stable performance without oscillation. The bypass or switch can be implemented economically.

Preferably, the adaptive filter mechanism to prevent oscillation exhibits an additional input, which represents the reference input of an unwanted interferer to be suppressed within the signal input. The DSP processor computes the cross correlation between the reference signal and the control signal at the output and as a result controls the delay in the reference path and the adaptive filter.

It is of advantage that despite the high selectivity also at the band limits the additional complexity of circuitry is small.

In a preferential arrangement of the invention, the implementation allows to switch in between the echo compensation or the suppression of interference.

This arrangement of the invention exhibits the advantage that depending upon application and requirement the user can configure and switch from one to the other.

Furthermore, digital down-conversion with a numerically controller oscillator is used and as the oscillator is used for both the down- and up-conversion a possible frequency shift is compensated with this implementation, with means for adaptive distortion correction being disposed between the means for digital down-conversion and digital up-conversion, the adaptive distortion correction means being connected to an additional input of the repeater.

This fact allows that the oscillators with lower frequency accuracy can be used and that this would be compensated reliably.

Preferably, the digital down-conversion consists of at least one module to decimate followed by a band filter cascaded with an up-converter followed by an integrating element and a band filter.

By this arrangement of modules to digitally down- and/or up-convert alias signals can be suppressed effectively, whereby the complex baseband signals I and Q are not affected by the decimation and/or interpolation and are unchanged within their effective bandwidth. The cascaded arrangement of band filter and decimation filter can be repeated several times (for example, 2×2), whereby respective band filter suppresses integral multiples of the image frequencies.

Finally it is provisioned that between an input mixer and an analog-digital converter a low-pass filter is arranged and between an output mixer and a digital-analog converter a further low-pass filter is used.

With the input low-pass filter noise can be suppressed, so that it does not fold into the used frequency band and with the output low-pass filter, higher order alias signals due to the digital signal processing are effectively suppressed.

BRIEF DESCRIPTION OF THE DRAWINGS

Figure 1:
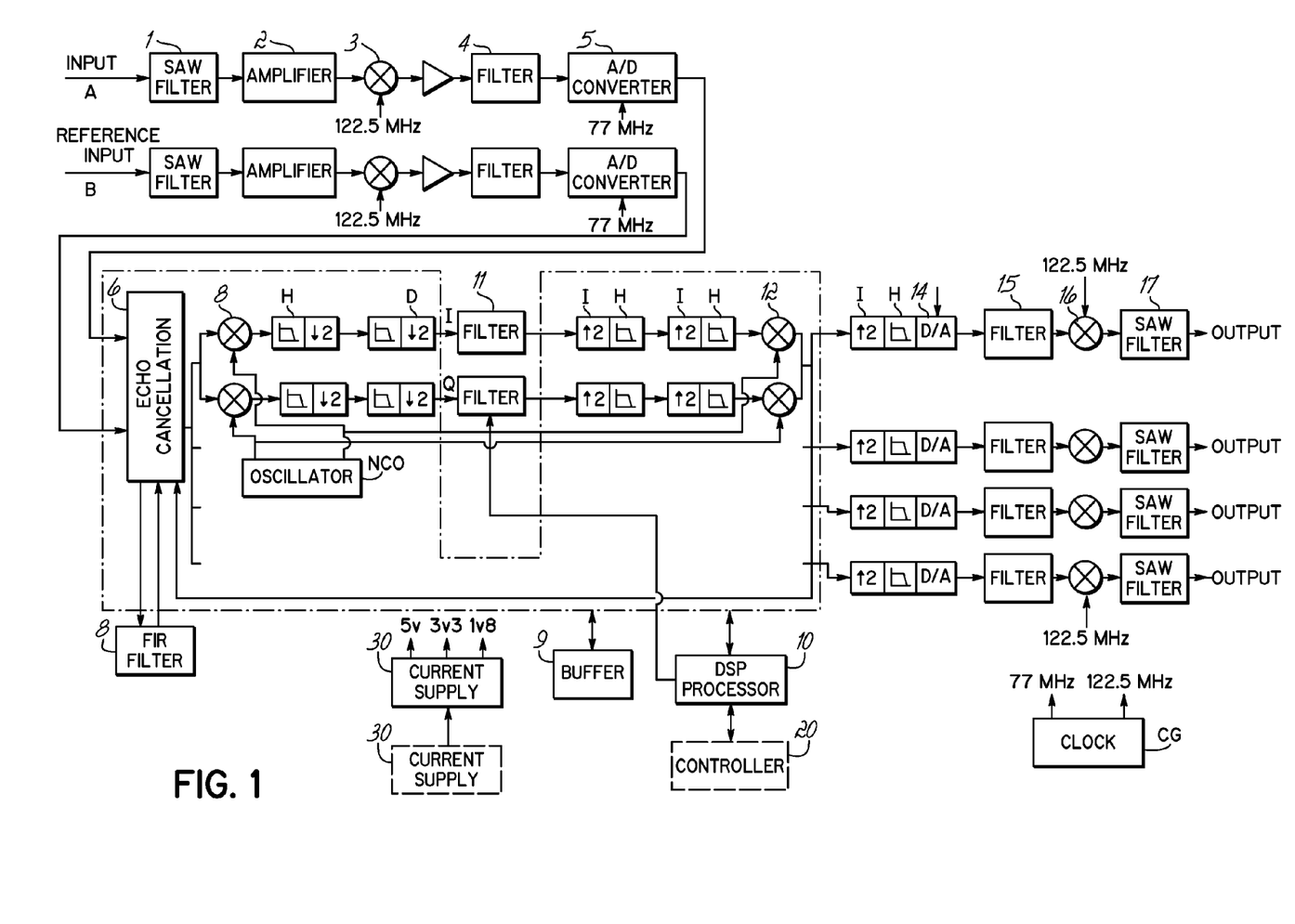
FIG. 1 the block diagram of an implementation example of the arrangement according to invention for a GSM-system and FIG. 2 the block diagram of an implementation example of the arrangement according to invention for a UMTS-system, FIG. 3 the block diagram of an implementation example to the echo compensation both in the GSM-system and in the UMTS-system, FIG. 4 the block diagram of an implementation example for the suppression of interference in both a GSM-system and in a UMTS-system and FIG. 5 the repeater for an implementation example after FIG. 2.
Figure 2:
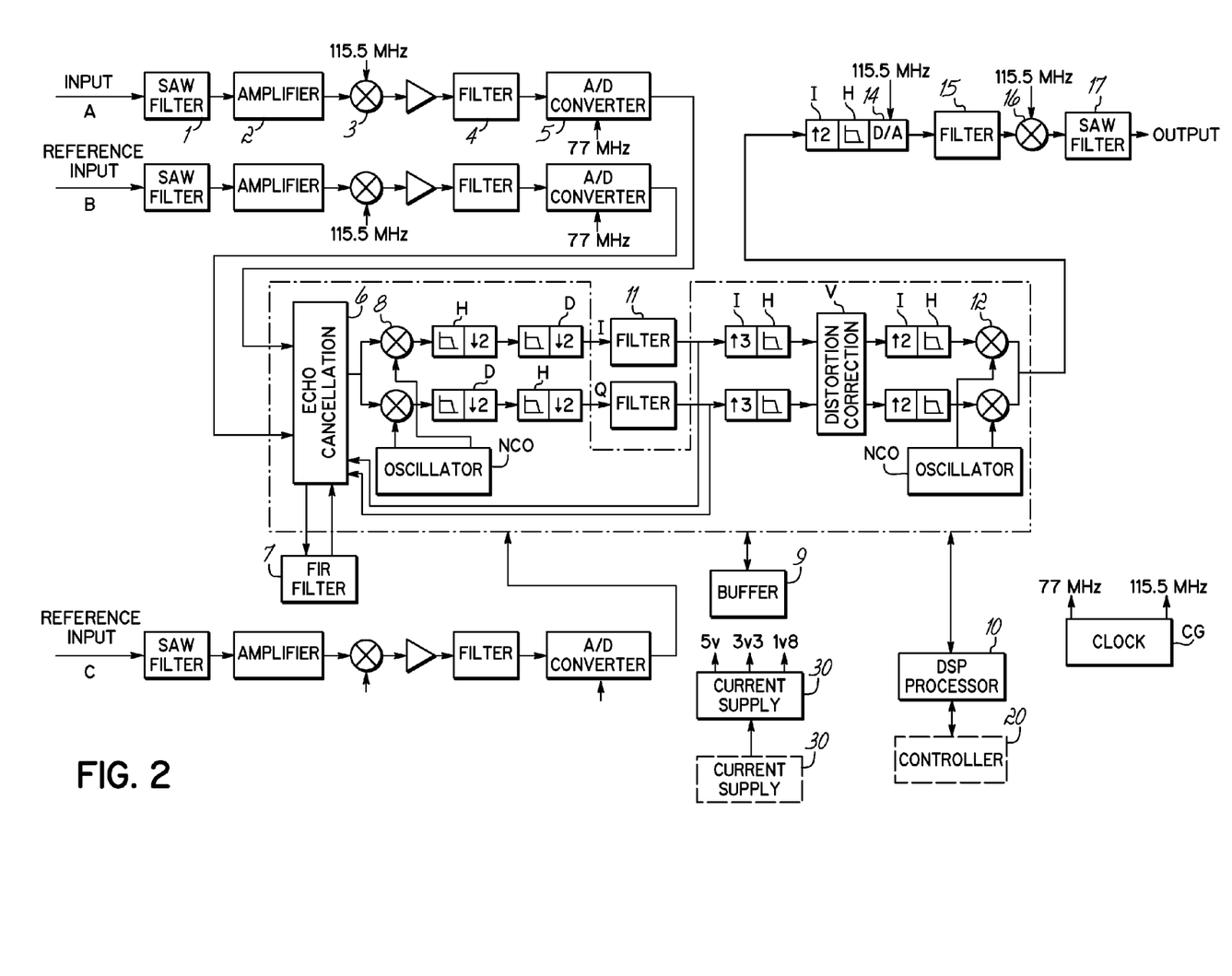

Further advantages and details can be taken out of the following description of a preferred design approach of the invention with reference to the diagrams. In the diagrams is shown:

FIGS. 1 and 2 depict a digital signal processing modules according to invention with the following functions:
signal filtering in the repeater,
suppression of the output echo received at the input of the repeater,
suppression of the signals produced in the repeater and
suppression of the environmental interference from outside of the repeater.

The accompanying drawings, which are incorporated in and constitute a part of this specification, illustrate embodiments of the invention and, together with a general description of the invention given below, serve to explain the principles of the invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The digital signal processing module consists of a receiver, a channel filter and a transmitter. The receiver module at least exhibits the cascade of a down-converting analogue mixer including a filter for the RF input signal, an analogue-digital converter, decimation stages and filters and digital down converter. The transmitter module contains as a minimum the cascade of an interpolating filter, a distortion corrector, digital up-converter, digital-analogue-converter and an analogue up-conversion mixer. Alternatively both down-conversion and up-conversion can be direct to/from base band.

In the following, the block diagram as seen in FIG. 1 and FIG. 2 as a possible implementation of the invention for the GSM-system and for the UMTS system will be explained in detail. The digital signal processing module in this example is capable of processing up to four GSM channels or two adjacent UMTS channels. Four bi-directional GSM band segments can be processed in parallel by one module in the Uplink branch UZ (see FIG. 5) and Downlink branch DZ (see FIG. 5) of the repeater. Each segment has a range from 200 kHz to 6.25 MHz, so that an overall bandwidth of 25 MHz is achievable. The respective bandwidth is programmed through a set of filter coefficients for the channel filter (see 11 in FIG. 1 and FIG. 2), whereby the filter coefficients are computed off-line (see 10, 20 in FIG. 1 and FIG. 2). For all four segments only one analogue input circuitry (see FIG. 1) is intended.

The carrier frequency of the input signal of the GSM-system as described in the following on the basis of FIG. 1 is 140 MHz. For this frequency range commercial SAW-filter 1 and 17 (surface acoustic wave filters) with a group delay of 1.17 µs having a tolerance bandwidth between 17 nsec and 50 nsec and a rejection of 50 dB to 60 dB to suppress the image frequency are readily available. Preferably between SAW-filter 1 and the mixer 3 a variable gain amplifier 2 is positioned to prevent the analogue-digital converter to be overdriven. The adjustable amplifier 2 is controlled by a detector at the amplifier input with a maximum time constant of 20 µs. The mixer 3 shall not cause interference with the active input signals, so that preferably a double-balanced mixer is selected. A low-pass filter 4 in front of the analog-digital converter 5 suppresses noise, which could alias back in the used frequency band between 127.5 MHz and 152.5 MHz.

An example for the analog-to-digital conversion a converter 5 with a maximum sample rate of 80 Mbit/s and a resolution of 14 bits can be used. The SNR relationship is for a signal with 30.5 MHz and −1 dBFS at the maximum conversion rate is about 73.5 dB. For the suppression of the alias band between 47 MHz and 72 MHz the sampling rate of the analog-to-digital converter 5 is preferably selected to 77 MHz, which allows the use of a less complex low-pass filter for 4 with an edge frequency of 33 MHz.

Figure 3:
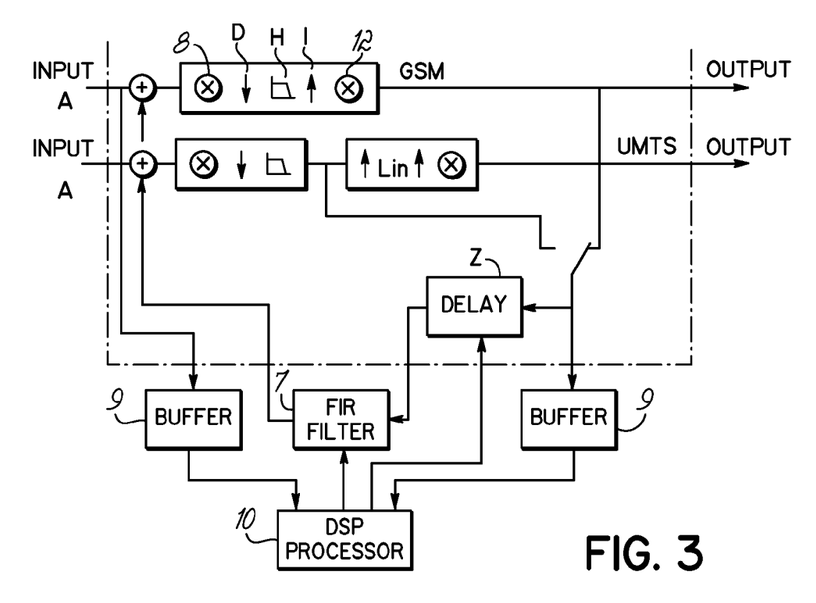

The echo cancellation 6 is used with GSM, UMTS and IS 95 as examples; details are represented in FIG. 3. The feedback between transmission and receiving antenna can be cancelled by a FIR filter 7. According to the invention the transfer function of the feedback path is computed, the inverse transfer function and the FIR-filter coefficients are adjusted to minimize the remnant of the feedback signal that will be re-transmitted. A DSP processor 10 read the samples captured at the input A and at the output O out of buffer 9, to compute the correlation between A and O and determine the required delay time (in Z) in the feedback path and the FIR filter 7. In order to realize the FIR filter 7, dedicated integrated filter circuits are available (e.g. two Gray Chips). In the GSM-system the sum of the 4-Segment output signals can be used to derive the control for the adaptive filter settings.

In the UMTS-system as shown in FIG. 3, the digital complex base band signal is used to control the adaptive filter settings. The signal is thus split off before the linearization circuit Lin and/or the distortion correction circuit V (see FIG. 2).

Depending on the selected FIR filter structure, a wider range of delay spread for the feedback signal can be cancelled, provided that the delay of the feedback with the longest delay is smaller than the delay of the FIR filter. An adaptive filter will adjust to the individual delay pattern.

Figure 4:
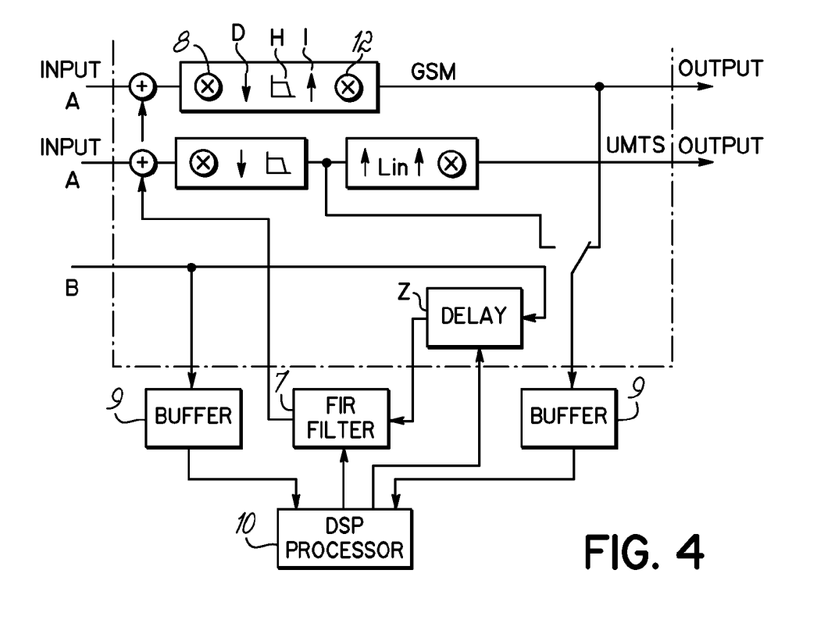

For the suppression of external interferers in receive band the digital repeater has an additional input B to the adaptive filter 7 as shown in FIG. 4 for both the GSM-system and/or UMTS-system. This input B represents the reference input of the unwanted interfering signal. The DSP processor 10 computes the cross correlation between the reference signal B and the control signal at the exit O and in accordance with their condition the delay (in Z) in the feedback path and FIR filter 7 is adjusted.

According to invention the aforementioned cancellation mechanism can be used for both the echo cancellation and the suppression of interference, as it immediately visible by comparing FIG. 3 and FIG. 4.

The echo compensation and/or interference canceller follows a digital down-converters 8 section. It consists of four digital mixers to divide the input signal into four complex base band segments. For each segment a digital numerically computed in-phase quadrature oscillator NCO is fed into the digital mixer 8. The output of the digital mixer is a complex base band signal. The oscillator NCO is used in both cases for the down-conversion as well as for the up-conversion. The oscillator signal is 14 bits wide and operates at a clock frequency of 77 MHz. The tuning step size the oscillator output frequency is thus limited to 4,699.707 cycles per second and the center frequency of the channel filter can be adjusted with an accuracy of ±2.350 cycles per second around the desired signal. The oscillator NCO can be tuned within an interval of approximately 5 MHz to 30 MHz. In case of frequency hopping the hopping frequencies and the timing procedure is calculated by the controller 20. In order to allow smaller oscillator tuning steps the resolution of the oscillator can be increased resulting in more resources required. As the oscillator NCO is used for down- as well as for up-conversion, a possible frequency error will be compensated.

The output of the device 8 provides an I component and Q component in the complex base-band with a sample rate of 77 MHz. In the implementation example, the bandwidth of segment is max. 6.25 MHz. In order to reduce the data rate and avoid aliasing, a decimation filter and stage is following, which consists of a cascade of a decimation filter H and a decimation stage D exhibiting a decimation by a factor 2, a second decimation filter H and again means D to decimate by a factor of 2. In detail the decimation reduces the sample rate to 19.25 MHz (1/4 of sample rate of 77 MHz), whereby the base-band signals I and Q are not affected by the decimation and further exhibit a bandwidth of 3.125 MHz. For the dimensioning of the filters H, the mirror frequencies proximate 19.25 MHz, 57.75 MHz for the second decimation filter H and proximate 38.5 MHz, 77 MHz for the first decimation filter H must be treated with care, since signals with integer multiples of 19.25 MHz would otherwise appear as alias signals at the decimation output. With increasing base band bandwidth the requirements on the decimation filter become more stringent.

With the implementation example with four GSM-segments as band-pass filter 11 a 128-wide FIR filters with linear phase is used at a sample rate of 19.25 MHz. The filter coefficients are stored in memory or computed off-line (in 10, 20). By setting the filter coefficients the bandwidth is determined. The implementation example results in a group delay of the channel filter 11 of approximately 2.9 µs.

The following transmitter contains the interpolator, which consists of a cascade of element I to interpolate by a factor of 2 and a band filter H, repeated again, representing a total interpolation of a factor 4, whereby the sample rate at the exit of the interpolating stage is again 77 Mbit/s. The digital up-converter 12 corresponds to a digital I/Q modulator to an intermediate frequency between 5 MHz and 30 MHz. The digital-to-analog converter 14 convert the intermediate frequency signal into an analog intermediate frequency band with a 77 MHz sampling frequency and a resolution of 14 bits. For each segment an analogue-digital converter 14 is intended. Finally the transmitter exhibits a mixer 16 to the up-conversion to the final radio frequency band.

The digital-to-analog converter 14 is followed by a low-pass interpolation filter 15 to suppress image frequencies of digital signal. The 1 dB edge frequency in the implementation example is approx. 33 MHz. The oscillator (the source of clock CG with 77 MHz and/or. 122.5 MHz) corresponds to the same oscillator in the receiving path, which allows the phase noise impact of this oscillator to the repeated signal to be compensated and minimized. A SAW band filter 17 at the output of the mixer 16 allows rejecting spurious frequencies. The output signal O of the transmitter part within the described implementation example is centered on 140 MHz and exhibits a bandwidth of 25 MHz. For four GSM segments and/or for the four mixers the same oscillator is used.

The total group delay of the digital signal processing repeater path including receiver module, channel filter module and transmitter amounts to 6.46 µs for a 200 kHz channel in the GSM-system and/or to 6.42 µs for a 6.25 MHz segment. Essential contributors to the total group delay are the SAW-bandpass filter with 2*1.17 µs in the receiver and transmitter the channel filter 11 with 2.89 µs (and/or 2.85 µs for the band segment).

A controller 20 is communicating to the DSP processor 10 in order to configure and control the repeater and its modules. The list of functions of the DSP processor 10 are: determination and configuration of the necessary delay and filter coefficients for the adaptive FIR filter 7, configuration of the channel filters 11 as well as monitoring of the modules. The local oscillator for the RF mixers 3 and 16 as well as the clock oscillator for the digital signal processing section is generated in the central reference clock oscillator module CG. Further the repeater exhibits a current supply 30 with 5 V DC and 3.3 V DC for digital and analog circuits.

A block diagram of an execution form of an arrangement according to invention for the UMTS-system will be detailed in the following using FIG. 2. As already detailed for the GSM system in FIG. 1, the digital signal processing module is capable to process a maximum of two adjacent UMTS RF channels as one block. Since each UMTS channel has a bandwidth of 5 MHz, the resulting bandwidth is 10 MHz. The one block consisting of up to two UMTS channels is treating the individual UMTS channel not separately but as one signal with channel filtering and a distortion correction processing affecting the whole signal as a block.

The receiver module expects two adjacent channels at a center frequency of 140 MHz. Similar to the GSM-system (see FIG. 1) commercial SAW-filter 1 now with a bandwidth of 10 MHz and one group delay time of 1. 92 µs are planned. The mixer 3 in the receiver module is operated with a oscillator frequency of 115.5 MHz resulting in an intermediate frequency output of 24.5 MHz. The analog-to-digital converter 5 is similar as in the GSM-system and likewise is operated at a clock frequency of 77 MHz. The echo compensation is identical to the GSM system as well (see FIG. 1 and FIG. 3).

The digital numerically controlled oscillator NCO for the two digital mixers 8 used for the conversion of the signal to the complex base-band is operated at 77 MHz with 14 bits width. The NCO is tuned to 24.5 MHz and its tuning step size is 7,049.56 cycles per second.

At the output of the mixer 8 decimation stage and filter (with H, D) are used to reduce the sample rate similar to the GSM-system. The I- and Q-signal components in the base-band are not modified by the decimation and continue to exhibit a range of ±5 MHz.

Also the bandpass filter 11 corresponds to the filter for the GSM-system as described above, whereas here the filter is optimized for two UMTS channels.

The following transmitter module contains an interpolating element, which accomplishes the interpolation in two steps: the first interpolation by a factor 3 (changing the sampling rate from 19.25 MHz to 57.75 MHz) followed by the distortion corrector V and the second interpolation by a factor 2 after the distortion corrector V. Again arranged interpolation filter H are intended to suppress the image frequencies. Accordingly, the bandwidth of the I and Q components is preferably increased from 10 MHz to 30 MHz. The second interpolating element changes the sampling frequency to 115.5 MHz and an interpolation filter H follows to suppress the unwanted image frequencies.

A digital quadrature upconversion stage 12 combines the I and Q components and convert them to an intermediate frequency of 24.5 MHz. The digital numerically controlled oscillator NCO is operated at the sample clock frequency of 115.5 MHz which is 1.5 times the frequency of the NCO sample clock used in the downconversion.

Finally a digital-to-analog converter 14 followed by a lowpass filter 15 convert the signal in an analog signal at 24.5 MHz intermediate frequency. An upconversion mixer 16 and SAW bandpass filter 17 convert the signal further to the intermediate frequency of 140 MHz used in the repeater system. The total group delay of the digital signal processing module consisting of receiver module, channel filter module and transmitter increased in comparison to the GSM system slightly and amounts to 6.96 µs for one UMTS channel and/or 6.92 µs for two UMTS channel. Essential contributions to the group delay come from the SAW-bandpass filter in the receiver and transmitter with 1.92 µs and 1.11 µs and of the channel filter with 2.59 µs (or 2.55 µs for two UMTS channel).

Figure 5:
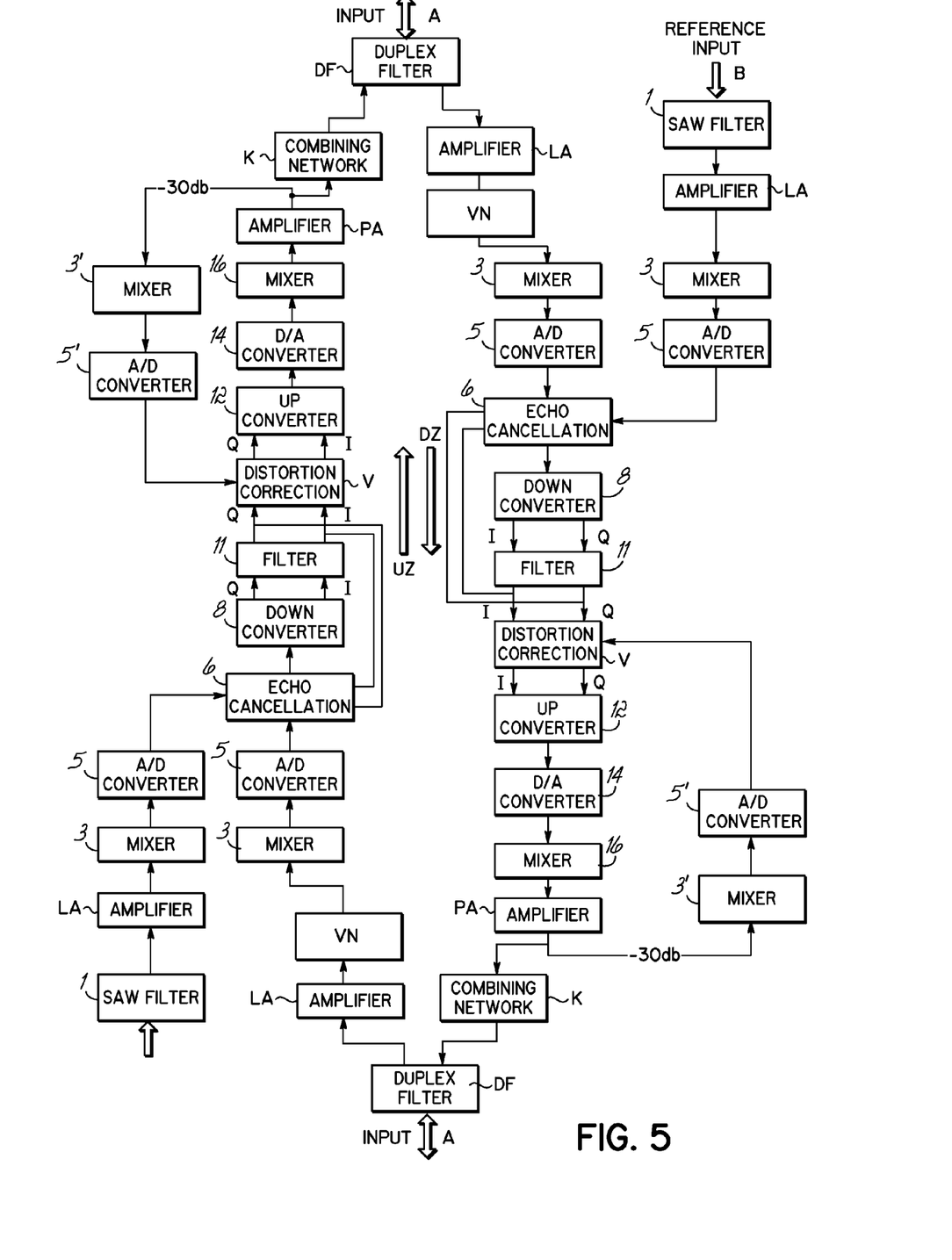

The DSP processor 10, the system clock generator CG, and the current supply 30 have the same function as detailed in the description of the GSM system. Details of the whole repeater and its internal procedures are depicted in FIG. 5 and will be described briefly in the following with reference to the respective components.

A duplex filter is disposed at each input or output of the uplink branch UZ or downlink branch DZ of the repeater and is connected to an amplifier LA and a combining network K. A splitter network is disposed between the amplifier LA of the uplink branch UZ or downlink branch DZ and the analog mixer 3 for down conversion of the input signal. The adaptive feedback coupled amplifier PA (feedback coupling via 3' and 5') is connected to the combining network K of the downlink branch DZ or uplink branch UZ. This repeater amplifier 5 input is connected to the output of the analog mixer 16.

Digital signal processing according to invention can also be used in the TETRA system, IS 136 system, or IS 95/2000 system.

The costs of digital signal processing are determined by the costs of the analog-to-digital converters, digital-to-analog converters, FPGAs, DSPs, ASICs, and the required peripheral circuitry to implement the various stages required in the digital signal processing line up. For the employment of repeater systems with different required number of channels a modular architecture of the signal processing platform is beneficial.

Partitioning the various sub modules of the Downlink or Uplink paths can be realized in various ways. One approach will be described in detail. The receiver block as a combination of the analog downconversion to an intermediate frequency including bandpass filtering and analog-to-digital conversion is one possible block. A digital processing main block consisting of digital downconverter, decimation stages, channel filter, interpolation stages, linearization stages, digital upconverter, clock generation, and power supply is forming the major digital signal processing platform. The transmitter exhibits the digital-to-analog conversion, the RF upconversion including bandpass filtering. For all different systems (GSM, UMTS, and IS 95/2000) the mainboard is not necessarily different, while different receiver modules and transmitter modules are required for the different frequency bands.

In contrast to well-known repeaters with a digital signal processing module the digital repeater in the described invention would operate without change in the system concept with different wireless mobile systems. It is particularly favorable that only a re-configuration in the modules is necessary by the user, who can switch between the modes of operation, so that the specific requirements in different systems are away ensured.

In the comparison to the well-known state of the art the arrangement according to the invention demands no parallel processing or hardware line-ups and finally permits various application types at surprisingly small expenditure, and in addition the possibility to upgrade existing systems as well as the flexible and economical administration and configuration.

All represented and described variations of implementation, as well as all in the description and the design revealed new single characteristics and their combination among themselves, are essential for the invention. For example a digital filter can be used to replace a SAW band filter.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. A repeater configured to suppress external interference in the receive band of the repeater, comprising:
   a donor antenna that receives an input signal;
   a first filter that filters the input signal;
   a first amplifier that amplifies the filtered input signal;
   a down conversion component that converts the amplified and filtered input signal to an intermediate frequency signal;
   a digital signal processor that is configured to suppress the external interference from the intermediate frequency signal to generate a clear intermediate frequency signal;
   a reference input signal reflective of the external interference to the repeater, the reference input signal being separate from the input signal and coupled with the digital signal processor;
   the digital signal processor coupled with a control signal and configured to determine a cross correlation between the reference input signal and the control signal and further configured to adjust a filter to create a feedback signal used to suppress the external interference by adding the intermediate frequency signal with the feedback signal from the filter that has a similar amplitude and an inverted phase relative to the external interference;
   an up conversion component that converts the clear intermediate frequency signal to an output signal;
   a second amplifier that amplifies the output signal;

a second filter that filters the amplified output signal; and a coverage antenna that radiates the filtered and amplified output signal, wherein the filtered and amplified output signal is at or about the frequency of the input signal.

2. The repeater of claim 1, further comprising:

signal paths configured to continuously capture samples of the reference input signal and the control signal for use by the digital signal processor for suppressing the external interference.

3. The repeater of claim 1, wherein the digital signal processor is further configured to adjust the filter and minimize a remnant of the external interference in the output signal that is transmitted in the filtered and amplified output signal as well as determine a time delay for the feedback signal.

4. The repeater of claim 1 wherein the repeater is further configured for cancellation of an echo signal that is fed back from the output antenna to the input antenna, the digital signal processor coupled with the input signal and using the input signal and a control signal for cancellation of the echo signal.

5. A method of suppressing external interference in the receive band of a repeater, comprising:

receiving an input signal;

filtering the input signal;

amplifying the filtered input signal;

down-converting the amplified and filtered input signal to an intermediate frequency signal;

suppressing the external interference from the intermediate frequency signal to generate a clear intermediate frequency signal including:

providing, to a digital signal processor, a reference input signal that is reflective of the external interference to the repeater and is separate from the input signal and a control signal;

determining, with the digital signal processor, a cross correlation between the reference input signal and the control signal;

adjusting a filter to create a feedback signal;

suppressing the external interference by adding the intermediate frequency signal with the feedback signal from the filter that has a similar amplitude and an inverted phase relative to the external interference;

up-converting the clear intermediate frequency signal to an output signal;

amplifying the output signal;

filtering the amplified output signal; and radiating the filtered and amplified output signal, wherein the filtered and amplified output signal is at or about the frequency of the input signal.

6. The method of claim 5, further comprising:

continuously capturing samples of the reference input signal and the control signal for suppressing the external interference.

7. The method of claim 5, further comprising:

determining a time delay for the feedback signal; and adjusting the filter for minimizing a remnant of the external interference in the output signal that is transmitted in the filtered and amplified output signal.

8. The method of claim 5 further comprising cancelling an echo signal that is fed back from the output antenna to the input antenna, and using the input signal and a control signal to cancel the echo signal.

* * * * *